US011568130B1

(12) United States Patent
Gaucher et al.

(10) Patent No.: US 11,568,130 B1
(45) Date of Patent: Jan. 31, 2023

(54) DISCOVERING CONTEXTUALIZED PLACEHOLDER VARIABLES IN TEMPLATE CODE

(71) Applicant: Synopsys, Inc., Mountain View, CA (US)

(72) Inventors: Romain Gaucher, Paris (FR); Mackenzie Robert Zunti, Seattle, WA (US); Thierry M. Lavoie, AB (CA)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 17/116,795

(22) Filed: Dec. 9, 2020

Related U.S. Application Data

(60) Provisional application No. 62/945,802, filed on Dec. 9, 2019.

(51) Int. Cl.
G06F 40/186 (2020.01)
G06F 21/57 (2013.01)
G06F 16/23 (2019.01)

(52) U.S. Cl.
CPC ........ *G06F 40/186* (2020.01); *G06F 16/2379* (2019.01); *G06F 21/577* (2013.01); *G06F 2221/031* (2013.01)

(58) Field of Classification Search
CPC .. G06F 40/186; G06F 16/2379; G06F 21/577; G06F 2221/031
USPC ........................................................ 715/243
See application file for complete search history.

(56) References Cited

U.S. PATENT DOCUMENTS

| | | | | |
|---|---|---|---|---|
| 6,029,175 | A * | 2/2000 | Chow | ..................... H04L 67/26 |
| 6,295,542 | B1 * | 9/2001 | Corbin | ..................... G06F 40/10 |
| | | | | 715/205 |
| 6,401,077 | B1 * | 6/2002 | Godden | .............. H04L 67/2814 |
| | | | | 709/219 |
| 7,100,109 | B1 * | 8/2006 | Chartier | .............. G06F 16/9566 |
| | | | | 707/E17.115 |
| 7,194,411 | B2 * | 3/2007 | Slotznick | ................. G09B 5/06 |
| | | | | 704/270.1 |

(Continued)

OTHER PUBLICATIONS

Laurel Stewart; What is Taint Checking?; Aug. 13, 2017; grammatech. com; pp. 1-4.*

(Continued)

*Primary Examiner* — Andrew R Dyer
(74) *Attorney, Agent, or Firm* — Lowenstein Sandler LLP

(57) ABSTRACT

Disclosed herein are computer-implemented method, system, and computer-program product (computer-readable storage medium) embodiments for discovering contextualized placeholder variables in template code. Some embodiments include invoking a render call to a template engine to render an input template and then receiving a message identifying a placeholder variable within the input template in response to invoking the render call. These embodiments may further include generating multiple rendered templates by rendering the input template based at least in part on a unique value and a modified unique value for the placeholder variable. Further still, these embodiments may also include storing the placeholder variable in a security vulnerability data structure in response to detecting a change in context associated with the placeholder variable between the multiple rendered templates.

20 Claims, 9 Drawing Sheets

(56) References Cited

U.S. PATENT DOCUMENTS

| | | | | |
|---|---|---|---|---|
| 8,296,650 | B2* | 10/2012 | Sudhi | G06F 40/174 715/253 |
| 9,049,222 | B1* | 6/2015 | He | H04L 63/1425 |
| 9,686,288 | B2* | 6/2017 | Kikuchi | H04L 63/102 |
| 9,830,453 | B1* | 11/2017 | Feiertag | G06F 21/562 |
| 2002/0010855 | A1* | 1/2002 | Reshef | G06F 21/554 713/164 |
| 2003/0218631 | A1* | 11/2003 | Malik | G06Q 10/107 715/739 |
| 2010/0066511 | A1* | 3/2010 | Barnett | G06K 19/0723 340/10.51 |
| 2010/0198841 | A1* | 8/2010 | Parker | G06F 16/951 707/750 |
| 2010/0268759 | A1* | 10/2010 | Hepper | H04L 67/02 709/230 |
| 2011/0154130 | A1* | 6/2011 | Helander | H04L 65/1006 714/48 |
| 2012/0260344 | A1* | 10/2012 | Maor | C07K 14/47 726/25 |
| 2014/0096257 | A1* | 4/2014 | Chou | G06F 21/562 726/25 |
| 2014/0172911 | A1* | 6/2014 | Cohen | H04L 67/42 707/770 |
| 2014/0283096 | A1* | 9/2014 | Neerumalla | G06F 21/54 726/26 |
| 2015/0100679 | A1* | 4/2015 | Chandaka | H04L 67/02 709/224 |
| 2015/0121533 | A1* | 4/2015 | Gluck | G06F 11/3476 726/25 |
| 2015/0135302 | A1* | 5/2015 | Cohen | H04L 67/34 726/12 |
| 2016/0119344 | A1* | 4/2016 | Freitas Fortuna dos Santos | G06F 21/554 726/7 |
| 2016/0234250 | A1* | 8/2016 | Ashley | H04L 63/105 |
| 2016/0259944 | A1* | 9/2016 | Okihara | G06F 21/552 |
| 2016/0337392 | A1* | 11/2016 | Weng | G06F 16/958 |
| 2017/0063914 | A1* | 3/2017 | Shafigullin | H04L 63/1433 |
| 2017/0277892 | A1* | 9/2017 | MacDermid | H04L 63/1466 |
| 2020/0336507 | A1* | 10/2020 | Lee | G06K 9/6269 |
| 2020/0380202 | A1* | 12/2020 | Cass | G06F 16/93 |
| 2021/0034754 | A1* | 2/2021 | Xiang | G06F 21/577 |

OTHER PUBLICATIONS

Angus Ferguson; String of values from a form using javascript; Nov. 17, 2016; https://coderanch.eom/t/672882/languages/String-values-form-javascript; pp. 1-4.*

Weber, D., Fischer, J. (2017). Static Syntax Validation for Code Generation with String Templates. In: Csöndes, T., Kovács, G., Réthy, G. (eds) SDL 2017: Model-Driven Engineering for Future Internet. SDL 2017. Lecture Notes in Computer Science(), vol. 10567. Springer, Cham. pp. 18-29.*

Nakamura, Y., Sato, F., Chung, H.V. (2007). Syntactic Validation of Web Services Security Policies. In: Krämer, B.J., Lin, K.J., Narasimhan, P. (eds) Service-Oriented Computing—ICSOC 2007. ICSOC 2007. Lecture Notes in Computer Science, vol. 4749. Springer, Berlin, Heidelberg. pp. 319-329.*

"Validating a Template;"AWS Documentation; Dec. 9, 2017; Amazon. com; p. 1.*

Koushik Sen, Swaroop Kalasapur, TasneemBrutch, and Simon Gibbs. 2013. Jalangi: a selective record-replay and dynamic analysis framework for JavaScript. In *Proceedings of the 2013 9th Joint Meeting on Foundations of Software Engineering* (ESEC/FSE 2013), 11 pages.

Guodong Li, Esben Andreasen, and Indradeep Ghosh. 2014. SymJS: automatic symbolic testing of JavaScript web applications. In *Proceedings of the 22nd ACM SIGSOFT International Symposium on Foundations of Software Engineering* (FSE 2014). 11 pages.

Liu, Chien-Hung. Data flow analysis and testing of JSP-based Web applications. In Information and Software Technology 2006. Elsevier, vol. 48, No. 12, 1137-47.

Steinhauser, Antonin, and François Gauthier. "JSPChecker: Static Detection of Context-Sensitive Cross-Site Scripting Flaws in Legacy Web Applications." In Proceedings of the 2016 ACM Workshop on Programming Languages and Analysis for Security, pp. 57-68. ACM, 2016.

Kirkegaard, Christian, and Moller, Anders. Static analysis for Java Servlets and JSP. In *International Static Analysis Symposium 2006*. Springer, 23 pages (including Appendices A through C).

\* cited by examiner

Vulnerability Detection

Prefix each renderable variable with specific strings to try to modify their initial HTML contexts 1) Assign each variable a globally-unique placeholder:  705

```
hash: {
    user : { name: 'nxzxkqbord_qag' }
    updates : {
        __iterable : {
            date : 'oeabymdxwmoz_o',
            body : 'q__g_elxwed_k'
        }
    }
    format: {__function_return: 'noydklnmlkgrmx'
}
```

2) Render the template (with completed hash) to HTML:

index.template

```
<p>Welcome to our website, nxzxkqbord_gag!</p>
<p>Posted on: oeabymdxwmoz_o</p>
<p>noydklnmlkgrmx</p>
```

710

3) Parse the generated HTML to find the set of contexts each variable exists within:  715 user.name: nxzxkqbord_qag

```
<p>Welcome to our website, nxzxkqbord_qag! </p>
                              user.name
                              [HTML_PCDATA]
```

4) Prefix these variables with specially-crafted strings to try to modify the variable's original context:  720 user.name: <script>nxzxkqbord_qag

```
<p>Welcome to our website, <script>nxzxkqbord_qag! </p>
                                    user.name
                                    [HTML_PCDATA, JS]
```

Context changed!
Report user.name as being vulnerable to XSS.

FIG. 7 user.name: <script>nxzxkqbord_qag

<p>Welcome to our website, <script> nxzxkqbord_qag ! </p>
user.name
[HTML_PCDATA]

Context unchanged!
user.name does not appear to be vulnerable to XSS.

DISCOVERING CONTEXTUALIZED PLACEHOLDER VARIABLES IN TEMPLATE CODE

CROSS-REFERENCE TO RELATED APPLICATIONS

This application is a non-provisional application claiming the benefit of U.S. Provisional Patent Application Ser. No. 62/945,802, which was filed on Dec. 9, 2019. Accordingly, this application claims priority under 35 U.S.C. § 119(e) to U.S. Provisional Patent Application Ser. No. 62/945,802, which is hereby incorporated by reference in its entirety.

TECHNICAL FIELD

The present disclosure relates generally to a computer system. In particular, the present disclosure relates to a system and method for discovering contextualized placeholder variables in template code.

BACKGROUND

It is increasingly common for an application to generate a document containing code by rendering an input template. For example, web applications frequently generate Hypertext Markup Language (HTML) documents by rendering input templates. An input template may describe the general structure of the document to be rendered and includes both fixed elements and placeholder variables. During rendering by a template engine, placeholder variables may be substituted with concrete values provided to the template engine by a user, a process called expansion. The final document generated by the rendering process may include code that is based, at least in part, on some of the concrete values provided by the user. Accordingly, by providing malicious concrete values to the template engine, it may be possible for a user to corrupt the structure of the document and/or change the intended operations of the code engine.

SUMMARY

One or more embodiments are directed towards a method for discovering contextualized placeholder variables in template code. The method may include invoking a render call to a template engine to render an input template and then receiving a message identifying a placeholder variable within the input template in response to invoking the render call. The method may further include generating multiple rendered templates by rendering the input template based at least in part on a unique value and a modified unique value for the placeholder variable. Further still, the method may include storing the placeholder variable in a security vulnerability data structure in response to detecting a change in context associated with the placeholder variable between the multiple rendered templates.

One or more embodiments are directed towards a non-transitory computer readable medium comprising stored instructions for discovering contextualized placeholder variables in template code. When executed by a processor, the instructions cause the processor to invoke a render call to a template engine to render an input template and then receive a message identifying a placeholder variable within the input template in response to invoking the render call. Further, the instructions also cause the processor to generate multiple rendered templates by rendering the input template based at least in part on a unique value and a modified unique value for the placeholder variable. Further still, the instructions cause the processor to store the placeholder variable in a security vulnerability data structure in response to detecting a change in context associated with the placeholder variable between the multiple rendered templates.

One or more embodiments are directed towards a system for discovering contextualized placeholder variables in template code. The system includes a memory storing instructions and a processor coupled to the memory. When the instructions are executed, they cause the processor to invoke a render call to a template engine to render an input template and then receive a message identifying a placeholder variable within the input template in response to invoking the render call. Further, the instructions cause the processor to generate multiple rendered templates by rendering the input template based at least in part on a unique value and a modified unique value for the placeholder variable. Further still, the instructions cause the processor to store the placeholder variable in a security vulnerability data structure in response to detecting a change in context associated with the placeholder variable between the multiple rendered templates.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 7 depicts an example of detecting placeholder variables within an input template that are potential security vulnerabilities in accordance with one or more embodiments.

FIG. 8 depicts an example of a template engine preventing a change in rendering context due to the runtime configuration in accordance with one or more embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
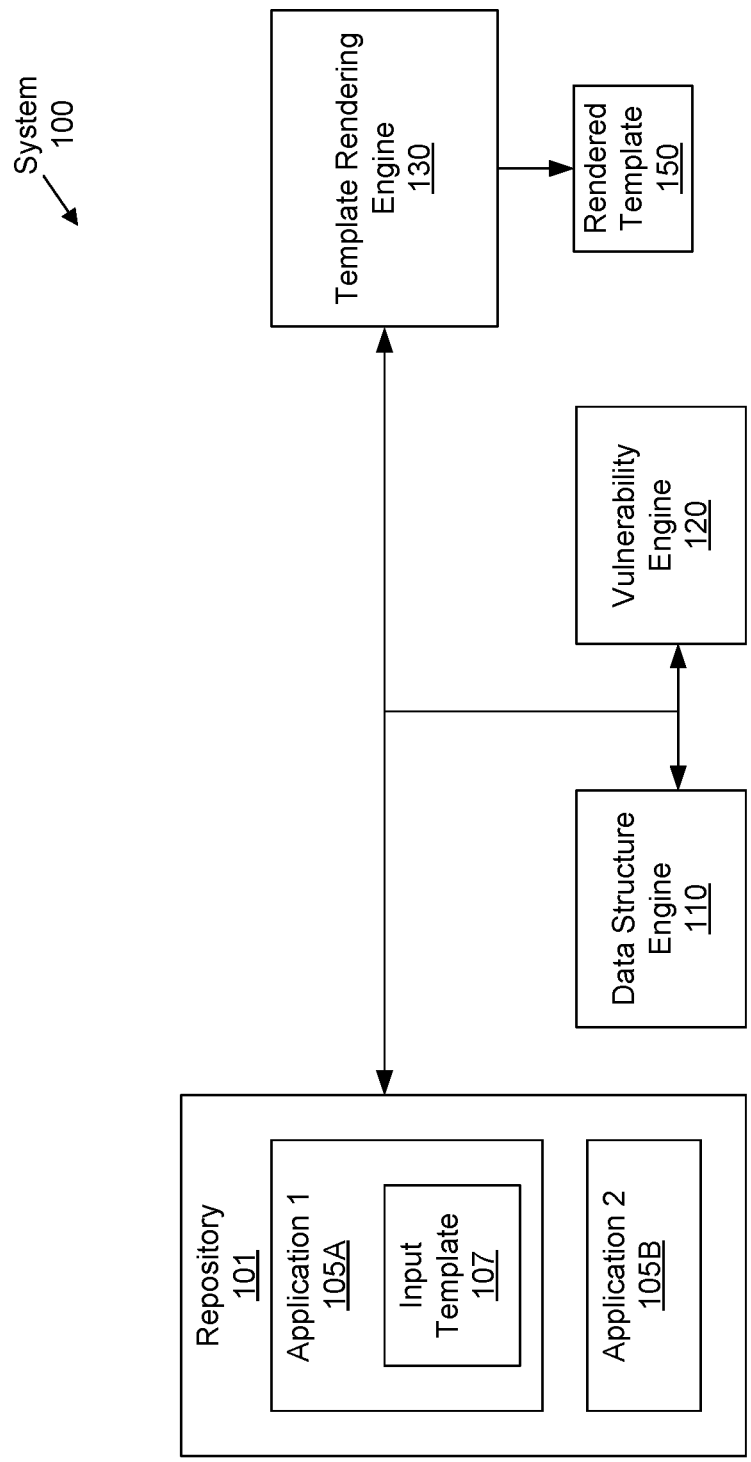
FIG. 1 depicts a system for discovering contextualized placeholder variables in template code in accordance with one or more embodiments.

Aspects of the present disclosure relate to discovering contextualized placeholder variables in template code.

Security vulnerabilities in computer programs may be determined through program analysis techniques (e.g., tainted-flow analysis) that track the flow of user-controllable data, referred to as taint sources, into key usage points within a program where the user-controllable data may cause unintended behavior, referred to as sinks. Tainted-flow analysis generally requires a priori knowledge of the sinks and taint sources that may be used in an application. However, input templates may include sinks (e.g., placeholder variables) that are not known in advance. Accordingly, if an application uses input templates to render a document with code (e.g., HTML document), this reduces the precision of tainted-flow analysis and may prevent the static analyzer from identifying the vulnerabilities.

A final document generated by a rendering process may include code that is based, at least in part, on concrete values provided by the user. Accordingly, the code may potentially be modified by malicious concrete values deliberately crafted by an attacker to corrupt the intended structure of the document and code within the document. This is a sink that should be considered by the tainted-flow analysis.

One or more embodiments are directed towards programmatically determining sink-specific information about input templates used by applications. This process may include three phases. In the first phase, the source code of an application using template-based rendering is parsed to determine exactly which template engines (and their versions) are being used, the input template(s) which will be rendered by those template engines, and any relevant configuration settings needed by the template engines which may affect how those templates are rendered. In the second phase, all the placeholder variables in an input template are determined using an iterative process that repeatedly calls the template engine to render (or at least attempt to render) the input template. In the third phase, the input template is rendered at least twice. The first rendering utilizes unique values for the placeholder variables (e.g., each placeholder variable is assigned a different value and no two values are the same). The second rendering utilizes the unique values modified with strings known to trigger changes in rendering contexts (e.g. the location of the unique value in the syntactic structure of the rendered template). If a change in contexts is identified (e.g., detected) between the two renderings for a placeholder variable, the placeholder variable is classified as a potential security vulnerability (i.e., a sink, discussed above). The identity of the placeholder variable may be added to a security vulnerability data structure that is displayed, printed, and/or stored. The security vulnerability data structure may also be used in a tainted-flow analysis (discussed below) for the application.

FIG. 1 shows a system 100 for discovering contextualized placeholder variables in template code in accordance with one or more embodiments. As shown in FIG. 1, the system 100 includes a repository 101, a data structure engine 110, a vulnerability engine 120, and a template rendering engine 130. Each of these components may be implemented in hardware, software, or any combination thereof. Moreover, different components (e.g., data structure engine 110, vulnerability engine 120, template rendering engine 130) may execute on the same or different computing devices (e.g., server, mainframe, desktop personal computer (PC), laptop, tablet PC, smartphone, etc.) connected by a network having wired and/or wireless segments.

Repository 101 stores one or more software applications (e.g., application 1 105A, application 2 105B). Each software application 105 may include or utilize one or more input templates (e.g., web templates). For example, application 1 105A utilizes input template 107.

In one or more embodiments, template rendering engine 130 is configured to render input templates. For example, during execution of application 1 105A, application 1 105A may request (e.g., via an application programming interface (API) call) that template rendering engine 130 render input template 107. Application 1 105A may also specify one or more settings for template rendering engine 130. These specified settings affect the rendering process and how some characters within placeholder variables and/or concrete values are processed. Those skilled in the art, having the benefit of this detailed description, will appreciate that autoescape is an example of such a setting. The result of rendering input template 107 is rendered template 150. Application 1 105A may execute the code in rendered template 150. Template rendering engine 130 may also be referred to as a template engine.

Data structure engine 110 is configured to determine the placeholder variables in the input templates (e.g., input template 107). The placeholder variables may be determined using an iterative process that is independent of the actual syntax of the input template and independent of any template engine-specific idiosyncrasies. Moreover, this iterative process may include repeatedly calling template rendering engine 130 to render (or at least attempt to render) input template 107. Operation of the data structure engine 110 is discussed below in reference to FIG. 3.

Vulnerability engine 120 is configured to classify one or more placeholder variables in input template 107 as a potential security vulnerability (e.g., a sink). This may include generating concrete values with strings known to trigger rendering context changes, and then requesting template rendering engine 130 render input template 107 using these concrete values. Operation of the vulnerability engine 120 is discussed below in reference to FIG. 4.

Figure 2:
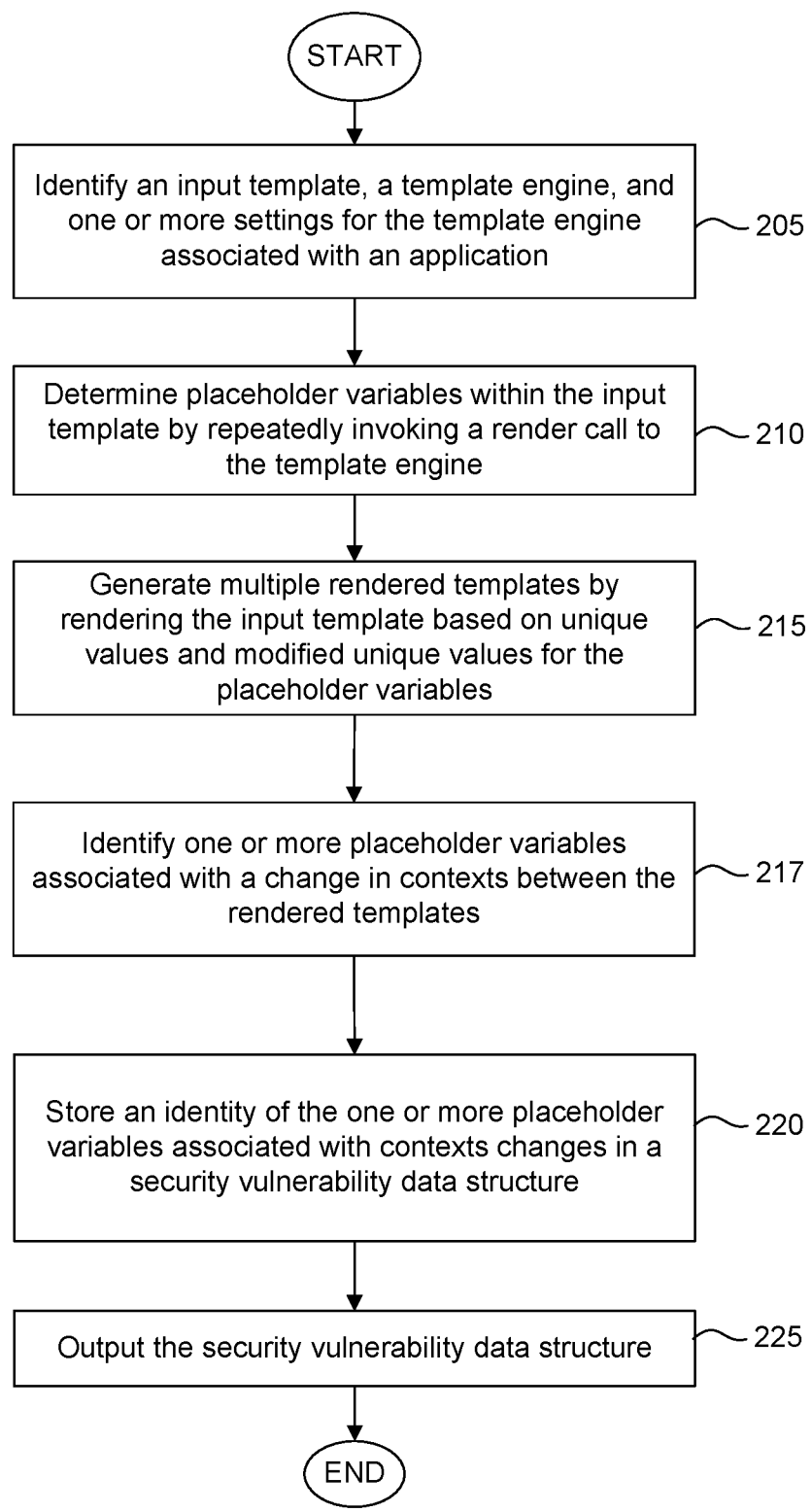
FIG. 2 depicts a flowchart for discovering contextualized placeholder variables in template code in accordance with one or more embodiments.

FIG. 2 depicts a flowchart for discovering contextualized placeholder variables in template code in accordance with one or more embodiments. One or more steps of the flowchart may be performed by the components of system 100 (e.g., data structure engine 110, vulnerability engine 120), discussed above in reference to FIG. 1. In one or more embodiments, one or more of the steps depicted in FIG. 2 may be omitted, repeated, and/or performed in a different order than the order depicted in FIG. 2. Accordingly, the scope of the present disclosure should not be considered limited to the specific arrangement of steps depicted in FIG. 2.

As discussed above, an application may include or utilize one or more input templates (e.g., web applications) and one or more template engines that render the input templates. At 205, an input template, a template engine that renders the input template, and the settings of the template engine (e.g., runtime configuration) are identified from the source code of the application. The identification process may include performing static analysis over the source code and/or textual examination of the source code and build infrastructure. The main purpose behind 205 is to determine exactly which template engines (and their versions) are being used within an application, the input template(s) which will be rendered by those template engines, and any relevant configuration settings needed by the template engines which may affect how those templates are rendered. An example of this identification process is discussed below in reference to FIG. 5.

At 210, one or more placeholder variables that exist within the input template are determined by repeatedly invoking a render call to the template engine. Each invocation of the render call results in the template engine attempting to render the input template, and each invocation of the render call may result in the discovery of another placeholder variable within the input template. Additional details regarding this determination process are discussed below in reference to FIG. 3. Moreover, an example of this determination process is discussed below in reference to FIG. 6.

At 215, at least two rendered templates are generated using the input template, the template engine, the settings for the template engine (e.g., runtime configuration of the template engine). An original rendered template is generated by using the template engine (configured to the settings) to expand the placeholder variables with unique values. One or more revised rendered templates are generated by using the template engine (configured to the settings) to expand the placeholder variables with modified unique values. In one or more embodiments, these modified unique values are the unique values concatenated with one or more trigger strings that are likely to change the context (e.g., lexical context, syntactic context, and/or semantic context) in which the unique values reside in the rendered template. Additional details regarding 215 are discussed below in reference to FIG. 4.

At 217, the one or more placeholder variables associated with a change in contexts between the original rendered template and the one or more revised rendered templates are identified. Each placeholder variable was assigned a unique value at 215. Contexts may be considered the location of the unique value in the syntactic structure of a rendered template. For each placeholder variable: (a) the contexts in which the corresponding unique value resides within the original rendered template are determined; (b) the contexts in which the corresponding unique value resides within the one or more revised rendered templates are determined; and (c) the contexts from (a) are compared with the one or more contexts from (b). If there are any differences, the placeholder variable is associated with a change in contexts. This may be repeated for all placeholder variables. Additional details regarding 217 are discussed below in reference to FIG. 4.

At 220, the identity (e.g., name) of each placeholder variable identified at 217 is stored in a security vulnerability data structure (e.g., a file) Each placeholder variable associated with a change in context may be a security vulnerability because the placeholder variable is susceptible to, for example, cross-site scripting (XSS). Accordingly, these placeholder variables are classified as potential security vulnerabilities by adding them to the security vulnerability data structure. If there is no change in contexts associated with a placeholder variable between the original rendered template and the revised rendered templates, the placeholder variable is classified as neutral (i.e., not a security vulnerability) and the identity of the placeholder variable is not added to the security vulnerability data structure. Accordingly, at the conclusion of 220, the security vulnerability data structure includes the identities of all placeholder variables deemed to be potential security vulnerabilities. Additional details regarding 220 are discussed below in reference to FIG. 4. Moreover, examples of 215, 217, and 220 are discussed below in reference to FIG. 7.

At 225, the security vulnerability data structure is outputted. This may include storing, displaying, and/or printing the security vulnerability data structure. In one or more embodiments, a tainted-flow analysis may be performed on the application (from 205) based on the security vulnerability data structure. As discussed above, a tainted-flow analysis may need a priori knowledge of the sinks (e.g., potential security vulnerabilities) in the application. The security vulnerability data structure provides the identities of the sinks (e.g., placeholder variables deemed to be potential security vulnerabilities). A tainted-flow analysis may confirm whether these placeholder variables really are security vulnerabilities.

Figure 3:
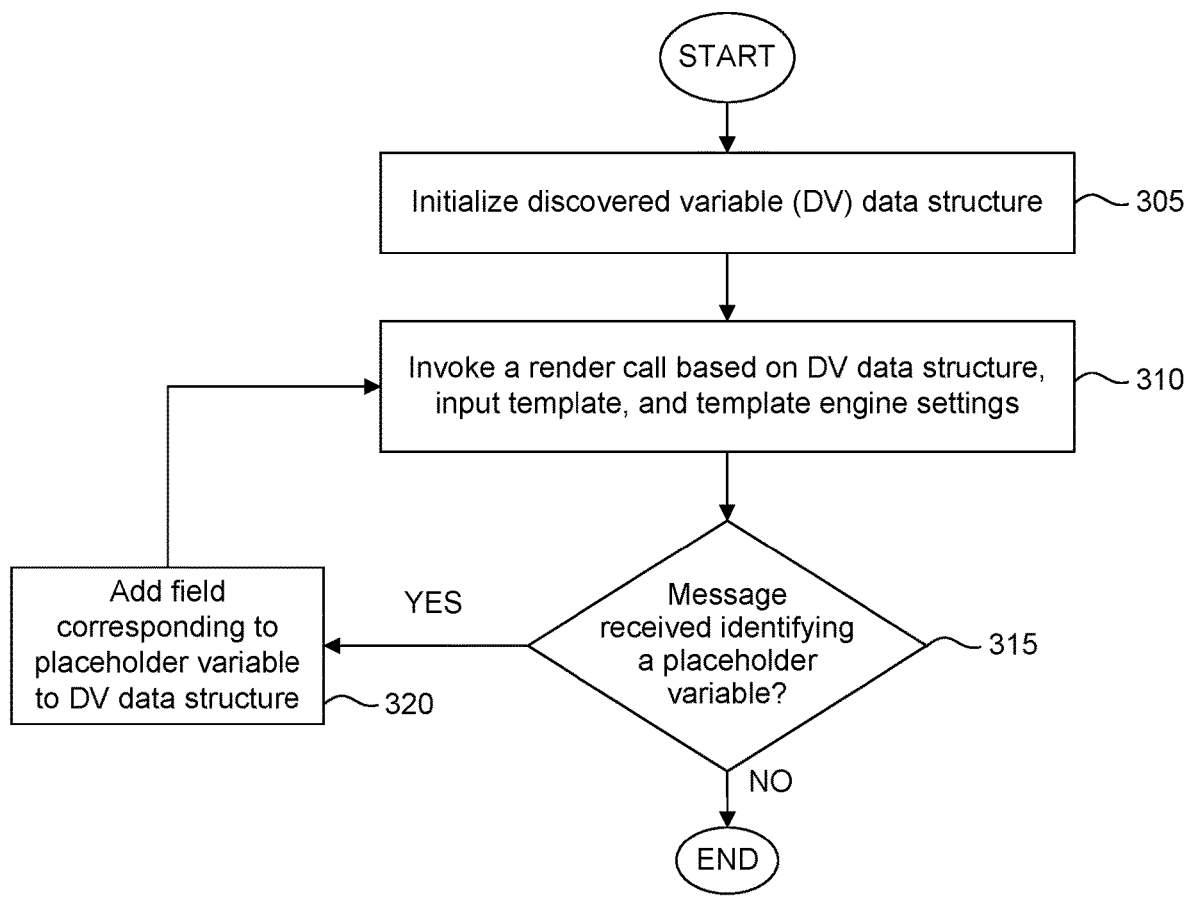
FIG. 3 depicts a flowchart for determining placeholder variable information from an input template in accordance with one or more embodiments.

FIG. 3 depicts a flowchart for determining placeholder variables within an input template in accordance with one or more embodiments. One or more steps of the flowchart may be performed by the components of system 100 (e.g., data structure engine 110), discussed above in reference to FIG. 1. In one or more embodiments, one or more of the steps depicted in FIG. 3 may be omitted, repeated, and/or performed in a different order than the order depicted in FIG. 3. Accordingly, the scope of the present disclosure should not be considered limited to the specific arrangement of steps depicted in FIG. 3.

The steps depicted in FIG. 3 may correspond to 210 in FIG. 2. Accordingly, a goal of the process in FIG. 3 is to determine the as-yet-unknown names of the placeholder variables within the input template.

Upon reaching 305, an input template, a template engine, and settings for the template engine (e.g., runtime configuration for template engine) have been identified. At 305, a data discovered variable (DV) data structure is initialized. The DV data structure, at 305, does not yet have any fields for the placeholder variables in the input template. However, the DV data structure may be initialized to include one or more callback functions (discussed below).

At 310, a render call is invoked. The render call may be an API call transmitted to the rendering engine. The format of the render call may have been determined during the static analysis over the source code and/or textual examination of the source code, discussed above in reference to 205 in FIG. 2. The render call may include/reference the input template, the DV data structure (with the specialized callback functions), and the settings.

In response to the render call, the template engine configures itself according to the settings, and attempts to render the input template (e.g., expand placeholder variables in the input template). In order to expand a placeholder variable in the input template, the template engine accesses the DV data structure in search of the field corresponding to the placeholder variable. In one or more embodiments, if the lookup is successful (e.g., a field for the placeholder variable exists in the DV data structure), the rendering process moves on to the next placeholder variable within the input template. If the lookup is unsuccessful, this triggers the callback function in the DV data structure to send a message with the name of the placeholder variable. Additionally or alternatively, an unsuccessful lookup might also cause the template engine to issue an error messages with the name of the placeholder variable.

At 315, it is determined whether one or more messages (e.g., error message and/or message sent by callback function) with the name of a placeholder variable within the input template has been received. When it is determined that such a message(s) has been received, the process proceeds to 320. Otherwise, when it is determined that no such message has been received (e.g., after a time interval), the process may end.

At 320, a field for the placeholder variable identified in the message is added to the DV data structure. In one or more embodiments, the added field is kept empty. In one or more embodiments, the added field is populated with an arbitrary value. In one or more embodiments, the added field is populated with an object that records any attempt by the template engine to access the added field/object and is used to generate a message associated with a callback function (at 315). The process then returns to 310, where another rendering of the input template is attempted.

Figure 6:
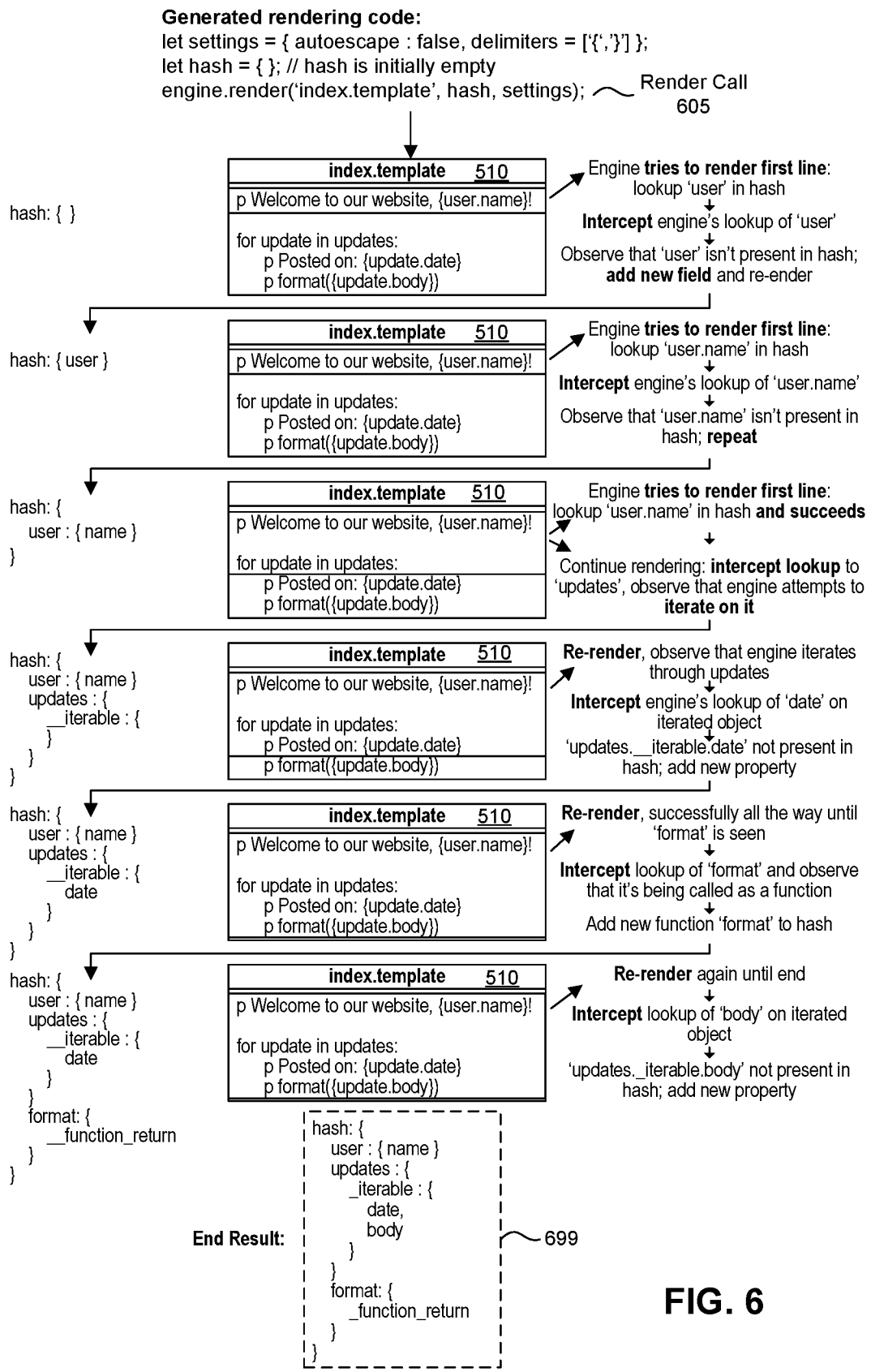
FIG. 6 depicts an example iterative process to determine placeholder variable information from an input template in accordance with one or more embodiments.

Those skilled in the art, having the benefit of this detailed description, will appreciate that during each iteration of the loop, another field corresponding to a placeholder variable in the input template is added to the DV data structure. These placeholder variables may be attributes of a data object and the information from any of the messages from the template engine are used to further refine and complete the data object in the DV data structure. Accordingly, after the flowchart depicted in FIG. 3 is executed, all the placeholder variables in the input template (and the relative structure of the data being passed into the render call by the application during normal operation) are determined. This determination process is independent of the actual syntax of the input template and independent of any template engine-specific idiosyncrasies. FIG. 6 provides a worked example of this determination process.

Figure 4:
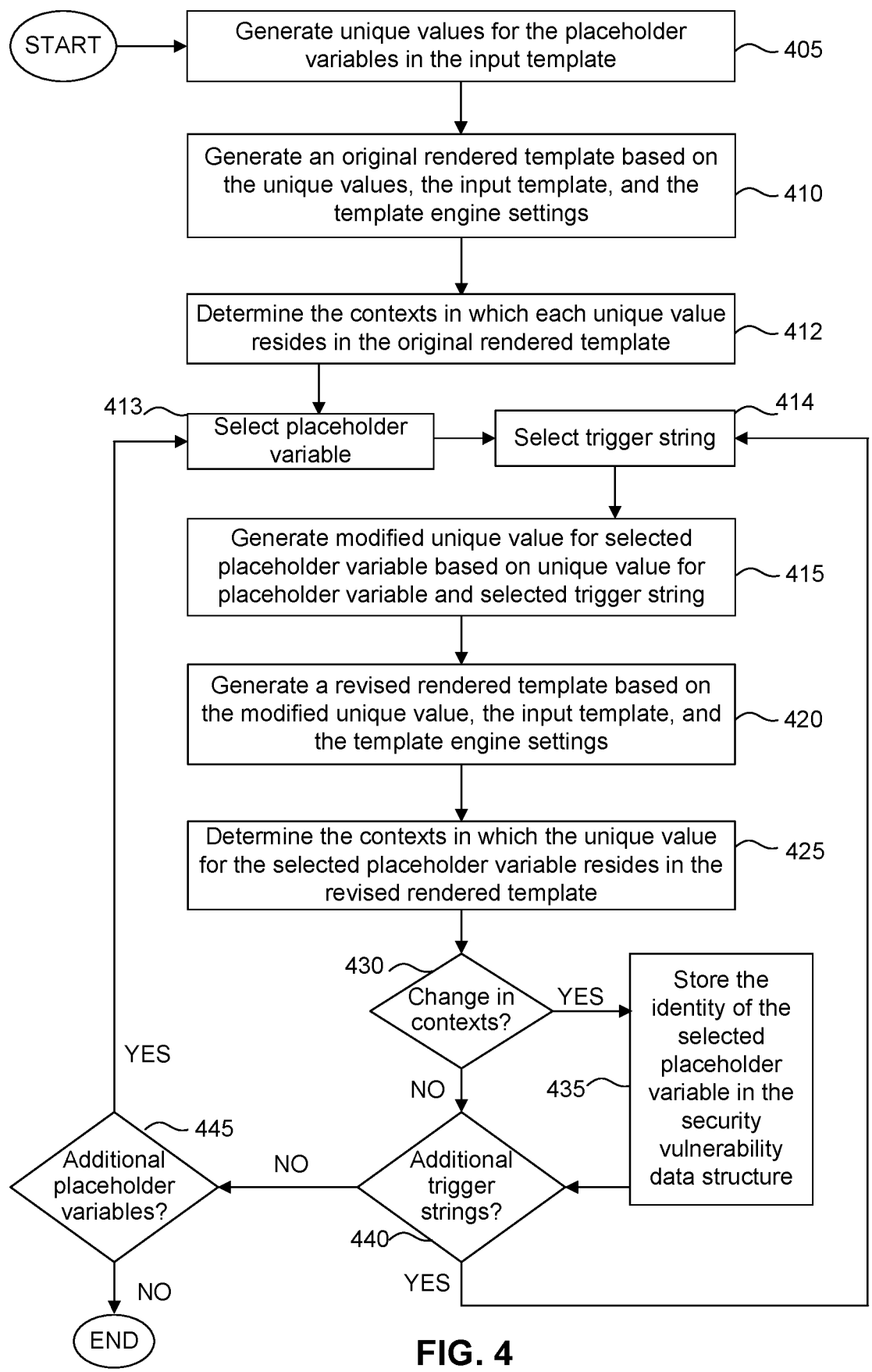
FIG. 4 depicts a flowchart for detecting placeholder variables within an input template that are potential security vulnerabilities in accordance with one or more embodiments.

FIG. 4 depicts a flowchart for detecting vulnerabilities within the input template in accordance with one or more embodiments. One or more steps of the flowchart may be performed by the components of system 100 (e.g., vulnerability engine 120), discussed above in reference to FIG. 1. In one or more embodiments, one or more of the steps depicted in FIG. 4 may be omitted, repeated, and/or performed in a different order than the order depicted in FIG. 4. Accordingly, the scope of the present disclosure should not be considered limited to the specific arrangement of steps depicted in FIG. 4.

The steps depicted in FIG. 4 may correspond to 215, 217, and 220 in FIG. 2. Accordingly, upon reaching 405, all the placeholder variables in the input template have been determined. At 405, a set of globally unique values are generated for the placeholder variables. These globally unique values may be randomly generated and no two values are the same. For example, the placeholder variable "user.name" may be assigned a randomly generated globally unique value "nxzxkqboard_qag", for example. These globally unique values allow for easy tracking in a rendered template.

At 410, an original rendered template is generated based on the unique values, the input template, and the template engine settings. This may include transmitting a render call including/identifying the unique values, the input template, and the settings to the template engine. In response to the render call, the template engine configures itself according to the settings, and renders the template input by expanding the placeholder variables in the input template with the unique values.

At 412, the one or more contexts (e.g., lexical context, syntactic context, and/or semantic context) in which each unique value resides in the original rendered template are determined. As discussed above, in one more embodiments, contexts refer to the location of the unique value in the syntactic structure of the original rendered template. If the original rendered template is an HTML document, a start tag may identify the start of a context while the end tag may represent the end of the context. Accordingly, the contexts in which a unique value resides may be determined by parsing the original rendered template. When a start tag is encountered during the parsing, the corresponding context is pushed onto a stack. When the corresponding end tag is encountered, the context is popped from the stack. This continues until the unique value is encountered in the original rendered template. At this point, the remaining contexts in the stack are the contexts in which the unique value resides in the original rendered template.

Staying with the example from 405, if the original rendered template includes "<p> text text text nxzxkqboard_qag! </p>", those skilled in the art, having the benefit of this disclosure, will appreciate that the tag <p> corresponds to the start of the HTML_PCDATA context. Thus, the context in which the unique value nxzxkqboard_qag resides in the original rendered template is the HTML_PCDATA context. As another example, if the original rendered template includes "<a href="http://www.somesite.com?test=nxzxkqboard_qag"> link </a>", those skilled in the art, having the benefit of this disclosure, will appreciate that the tag <a href=""> corresponds to the start of a URL context. Thus, the context in which the unique value nxzxkqboard_qag resides in the original rendered template is a URL context. Examples of additional contexts include HTML_TAG, HTML COMMENT, JavaScript™ (JS), Cascading Style Sheets (CSS), etc.

At 413, one of the placeholder variables (from 405) is selected. A placeholder variable may be selected at random from among the set of placeholder variables that have not yet been selected.

At 414, a trigger string is selected. A trigger string may be selected at random from among the set of trigger strings that have not yet been selected for the placeholder variable. The trigger strings may be retrieved from a database that existed before the start of the process depicted in FIG. 4. In general, a trigger string, when concatenated with a unique variable, will likely cause a change to the contexts in which the unique value resides in a rendered template. Example trigger strings include:

<script>
    "onerror=alert(1)>
    ';alert(1) "a="><svg/onload/alert(2)>
    "><img/src/onerror=alert(1)>
    </script><svg/onload/alert(1)>

At 415, a modified unique value is generated for the selected placeholder variable. In one or more embodiments, the modified unique value is the unique value (from 405) for the selected placeholder variable concatenated with the selected trigger string. The selected trigger string may be added as a prefix or suffix to the unique value. As discussed above, these trigger strings enable the modified unique values to break out the context intended/specified by the input template and into some other context not intended/specified by the input template (e.g., from a data context and into a scripting context).

Continuing with the example from 405, the modified unique value for "nxzxkqboard_qag" may be "<script>nxzxkqboard_qag".

At 420, a revised rendered template is generated based on the modified unique value, the input template, and the template engine settings. This may include transmitting a render call including/identifying the modified unique value, the input template, and the settings to the template engine. In response to the render call, the template engine configures itself according to the settings, and renders the input template by expanding the selected placeholder variable in the input template with the modified unique value.

At 425, the one or more contexts (e.g., lexical context, syntactic context, and/or semantic context) in which the unique value resides in the revised rendered template (from 420) is determined. As discussed above, the contexts in which a unique value resides may be determined by parsing the revised rendered template. When a start tag is encountered during the parsing, the corresponding context is pushed onto a stack. When the corresponding end tag is encountered, the context is popped from the stack. This continues until the unique value is encountered in the revised rendered template. At this point, the remaining contexts in the stack are the contexts in which the unique value resides in the revised rendered template.

Staying with the example from 405 and 415, if the revised rendered template includes "<p> text text text <script>nxzxkqboard_qag! </p>", those skilled in the art, having the benefit of this disclosure, will appreciate that the tag <p> corresponds to the HTML_PCDATA context, while the tag <script> corresponds to the JS context. Thus, the contexts in which the unique value nxzxkqboard_qag resides in the revised rendered template is the HTML-PCDATA context and the JS context.

At 430, it is determined whether there has been a change in contexts associated with the selected placeholder variable. In other words, it is determined if the contexts in which the unique value resides changes between the original rendered template (from 412) and the revised rendered template (from 425). When there is a change in contexts associated with the selected placeholder variable, the selected placeholder variable is a potential security vulnerability (e.g., susceptible to XSS) and the process proceeds to 435. When there is no change in contexts associated with the selected placeholder variable, the placeholder variable is not deemed to be a potential security vulnerability process proceeds to 440.

At 435, the identity of the selected placeholder variable is stored in the security vulnerability data structure.

At 440, it is determined whether there are any trigger strings that have not yet been selected for the selected placeholder variable. When it is determined there is at least one trigger string that has not yet been selected for this placeholder variable, the process returns to 414. When it is determined that all trigger strings have been selected for this placeholder variable, the process proceeds to 445.

At 445, it is determined whether there is at least one placeholder variable that has not yet been selected. When it is determined there is at least one placeholder variable that has not yet been selected, the process returns to 413. When it is determined that all the placeholder variables have been selected, the process may end.

Figure 5:
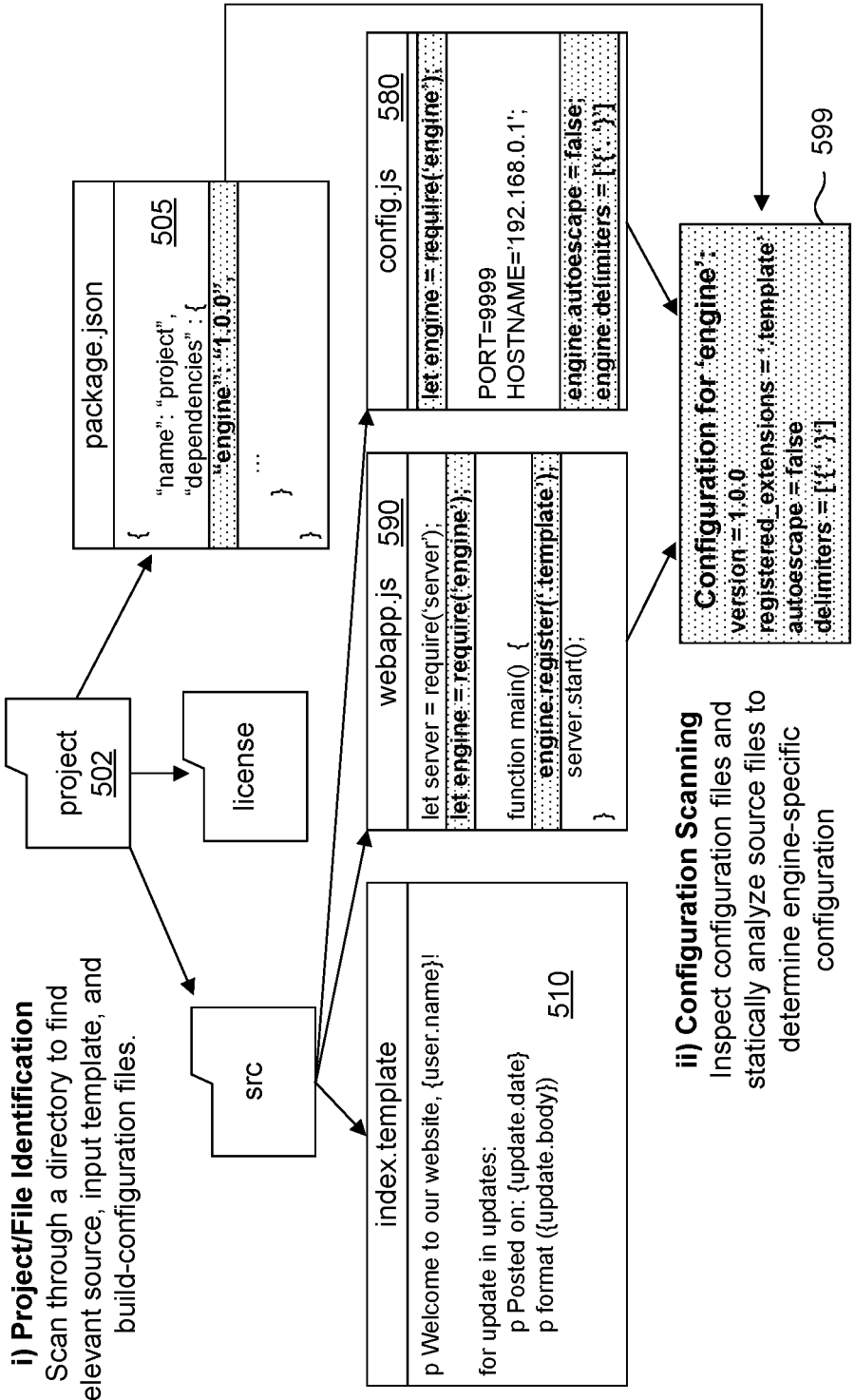
FIG. 5 depicts an example web application with input templates in accordance with one or more embodiments.

FIG. 5, FIG. 6, and FIG. 7 shows a series of examples. In FIG. 5, the source code of an application is parsed to identify an input template, a template engine, and a runtime configuration for the template engine used by the application. In FIG. 6, the placeholder variables within the input template (from FIG. 5) are determined. In FIG. 7, unique values and modified unique vales are used to classify one or more of the placeholder variables (determined in FIG. 6) as potential security vulnerabilities.

FIG. 5 depicts an example web application in JavaScript™ using templates in accordance with one or more embodiments. The web application is stored in a directory named 'project' 502. This directory contains a configuration file named package.json 505 which may describe elements of the configuration of the application, including the template engines (and their versions) that the application uses. Both webapp.js 590 and config.js 580 may be files in the source code of the web application. By applying the identification process 205, discussed above in reference to FIG. 2, to this example in FIG. 5, the project 502 is parsed and all information known to be relevant to the usage of template engines is extracted. In this case, the identification process 205 may have found an engine named "engine" at version "1.0.0". The identification process 205 may then recursively look inside the project directory and identify all JavaScript™ files (e.g., webapp.js 590 and config.js 580). Having identified all the JavaScript™ files, the identification process 205 may parse the JavaScript™ files to find evidence the template engine is used and extract the runtime configuration of the template engine. In this non-limiting example: (a) "engine" may be identified as a real in-use engine due to being found to have been imported by the JavaScript™ project code; (b) ".template" may be identified as the extension denoting the template files (e.g., index.template 510); (c) automatic escaping of JavaScript™ or template-engine syntax may be considered disabled by default; and (d) the default characters to be treated as delimiters by the template engine may be '{'and'}'.

The summarized results of the identification process 205 for this example may be in an output file including the configuration of the engine, denoted by the bottom-most box 599 in FIG. 5.

FIG. 6 depicts an example iterative process to determine placeholder variable information from an input template in accordance with one or more embodiments. This example corresponds to the determination process 210, discussed above in reference to FIG. 2, and discussed in FIG. 3. In this example, the input template is "index.template" 510, as identified in FIG. 5. When the determination process of FIG. 3 is applied to this example, the determination process may repeatedly invoke a render call 605 that includes a DV data structure named 'hash'. 'hash' includes one or more callback functions and is used to record information about variable substitution locations within the input template. In the first iteration, the template engine tries to render the first line of the input template (i.e., index.template) and looks up the sub-object named "user" in 'hash'. This may trigger the callback function and inform a user of the missing field and the missing field may be added to 'hash' for the subsequent iteration. Alternatively, an error may be generated from the template engine and one can analyze the error message to obtain the same information. In the next iteration, the process may be repeated, but it may be discovered that the sub-object "name" of "user" is missing from 'hash'. One may then add a field named "name" to this sub-object and proceed with the next iteration. One may continue this iterative process until having rendered the entire template successfully. The 'hash' data structure representing detected placeholder variables is presented in the dashed box 699.

FIG. 7 depicts an example of detecting placeholder variables that are security vulnerabilities (e.g., cross-site scripting (XSS) vulnerabilities) in accordance with one or more embodiments. This example corresponds to the process depicted in FIG. 4, and makes use of the index.template from FIG. 5 and the 'hash' DV data structure from FIG. 6. In 705, each placeholder variable in 'hash' may first be assigned a globally-unique value (e.g., no two assigned values are the same) to allow tracking them in the rendered template. For example, the placeholder variable "user.name" may be assigned the unique value "nxzxkqbord_qag". Then, in 710, the input template "index.template" may be rendered with those values and the resulting HTML output may be saved. Next, in 715, the HTML output may be parsed to identify the rendering context (e.g., lexical, syntactic, and/or semantic) in which all the rendered values may be located. For example, "nxzxkqbord_qag" in FIG. 7 is rendered in an HTML_PCDATA context, which may be vulnerable to XSS (and other security threats) by injecting a script tag for example. Finally, knowing the parsing context of each value, in 720, one may inject the same value prefixed with strings that may trigger an XSS (or another security threat). These trigger strings are known to cause a change in context (e.g., have triggered a change in context in the past) and may be retrieved from existing data repositories, such as vulnerability databases or related information sources. In an embodiment, "nxzxkqbord_qag" may be prefixed with the HTML script tag "<script>" and it may be determined it is not escaped properly since the parsing context of "nxzxkqbord_qag" is now HTML_PCDATA & JS instead of just HTML_PCDATA. One may conclude that the placeholder variable "user.name" is a potential security vulnerability (e.g. a sink). The unique value prefixed with one or more strings (e.g., "<script>nxzxkqbord_qag") is an example of a modified unique value from FIG. 4.

Those skilled in the art, having the benefit of this detailed description, will appreciate that a template engine may have different runtime configurations (e.g., different settings). Under some runtime configurations, a placeholder variable may be classified as a potential security vulnerability, while under other runtime configurations, the potential security vulnerability does not exist. In FIG. 7, the template engine had autoescape=false. As a result, the "<script>" prefix was able to trigger a context change in the rendered template. FIG. 8 shows the same setup as FIG. 7, except in FIG. 8, the template engine has autoescape=true. When "nxzxkqbord_qag" is rendered with "<script>" as a prefix, the HTML characters "<" and ">" are escaped and replaced by "<" and ">". Thus, the prefix "<script>" is not found anymore, there is no change(s) in context, and it may be concluded that "user.name" is not a potential security vulnerability.

In one or more embodiments, the example processes (e.g., FIGS. 5-8) may be generalized to applications using template engines in any programming languages. It may work as follows: The identification phase (e.g., FIG. 5) may remain structurally the same, but the list of engines and their idioms may include template engines for programming languages different than JavaScript™. Notably, files of interest may include source files for different programming languages (like Javs™ Java or C# with .java and .cs extensions). The placeholder variable determination phase (e.g., FIG. 6) may also remain structurally identical, with the exception that the callbacks described explicitly disclosed here are JavaScript™ specific and may not be capable of being directly reused in other languages.

To address this limitation, callbacks may be simulated using other features specific to each examined programming language, or alternatively simulated using a combination of code instrumentation and debugging mechanisms in the runtime. Finally, the last phase (e.g., FIG. 8) may or may not require any change as it does not rely on any idioms of JavaScript™.

The enhanced techniques described herein may result in benefits over conventional techniques that may rely on handwritten modeling of engines, thus being unaware of sinks residing inside of templates. By contrast, the enhanced techniques described herein may allow for additional support of any template engines, reducing or eliminating human effort. The enhanced techniques described herein may also provide significant benefits, because the enhanced techniques do not simply consider all concrete values substituted in the templates as vulnerable. Instead, the enhanced techniques may carefully reconstruct the rendering context of inferred placeholder variables by solving rendering constraints relevant to at least one selected family of attacks.

Thus, the enhanced techniques may bring about benefits including reduction of false-positive rates of taint-flow analysis, discarding expansion sites that are not vulnerable to injection attacks. To report defects, the naïve, conventional approach may need to consider all placeholder variables to be vulnerable to all injection-type attacks. The enhanced techniques may allow for identification of provably vulnerable sinks and may classify them with respect to the type of concrete attack that may abuse the vulnerability. As injection-type vulnerabilities are among the top ten security concerns every year according to the Open Web Application Security Project (OWASP), technologies improving the precision of injection-type vulnerabilities are likely to be used by static and dynamic analysis products and/or service providers.

Figure 9:
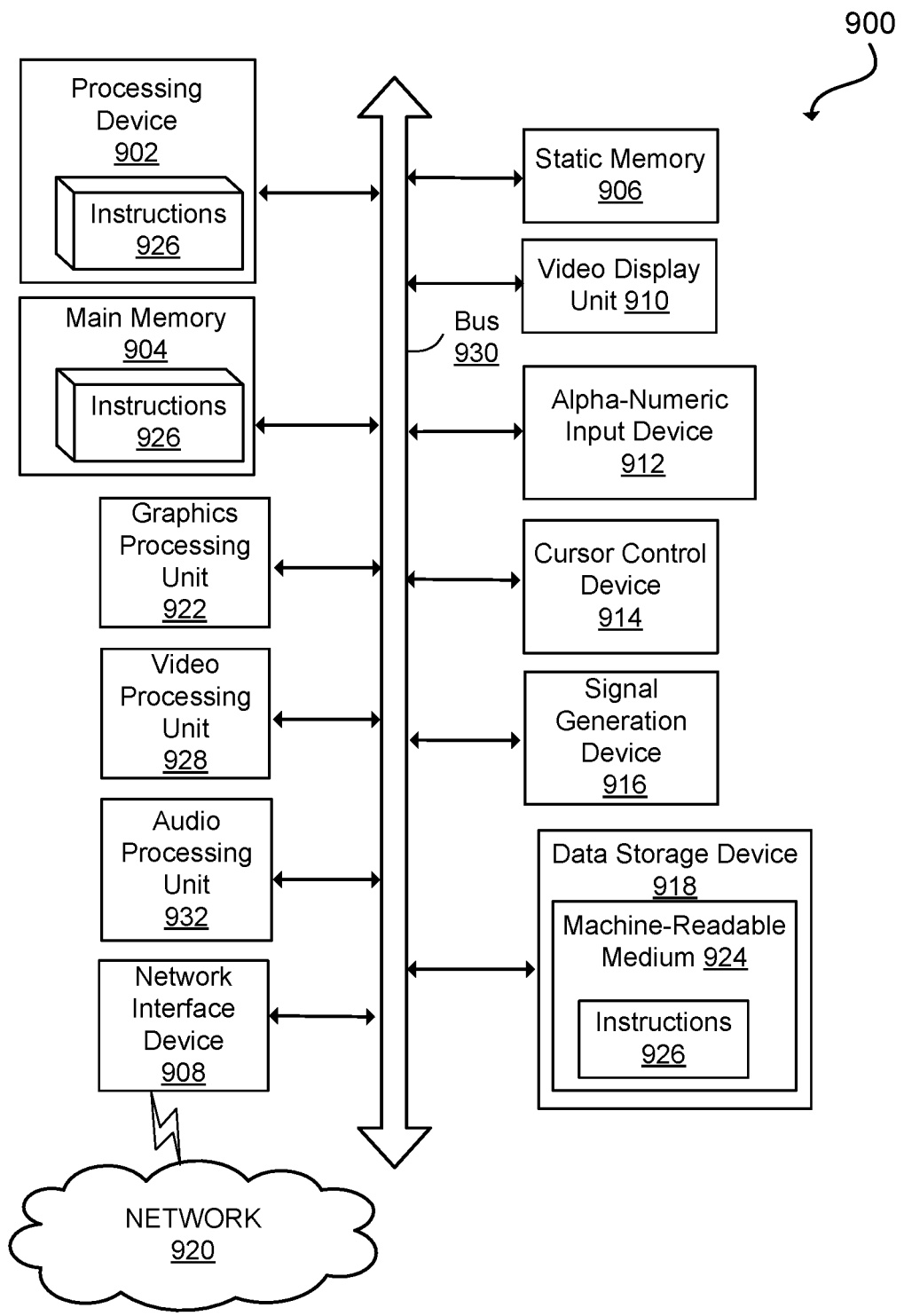
FIG. 9 depicts an abstract diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    invoking, a first render call to render an input template;
    receiving, a first message identifying a first placeholder variable within the input template in response to invoking the first render call;
    generating, a first rendered template by rendering the input template based on a unique value for the first placeholder variable;
    generating, a second rendered template by rendering the input template based on a modified unique value for the first placeholder variable, wherein the modified unique value comprises a trigger string concatenated with the unique value, and wherein the generating the second rendered template comprises changing a context of the unique value in a syntactic structure of the first rendered template based on the trigger string, wherein the context corresponds to a location of the unique value within the syntactic structure of the first rendered template; and
    storing, by at least one computer processor, an identity of the first placeholder variable in a security vulnerability data structure in response to detecting a change in the context associated with the first placeholder variable between the first rendered template and the second rendered template.

2. The method of claim 1, further comprising:
    adding a first field corresponding to the first placeholder variable to a discovered variable (DV) data structure in response to receiving the first message;
    invoking a second render call to render the input template, wherein the second render call comprises the DV data structure;

receiving a second message identifying a second placeholder variable within the input template in response to invoking the second render call; and adding a second field corresponding to the second placeholder variable to the DV data structure.

3. The method of claim 2, wherein the first render call comprises the DV data structure, wherein the DV data structure comprises a callback function, and wherein the first message is generated by the callback function when a template engine accesses the DV data structure while attempting to expand the first placeholder variable in the input template.

4. The method of claim 2, wherein the first message is an error message generated after attempting to expand the first placeholder variable in the input template.

5. The method of claim 2, wherein the first field corresponding to the first placeholder variable is populated with an object configured to record an attempt by a template engine to access the first field.

6. The method of claim 1, wherein the context is one or more of a lexical context, a syntactic context, and a semantic context.

7. The method of claim 6, wherein the syntactic context corresponds to the location of the unique value in a syntactic structure of the first rendered template.

8. The method of claim 1, further comprising:
executing a tainted-flow analysis with the first placeholder variable as a sink based on the security vulnerability data structure.

9. A non-transitory computer readable medium comprising stored instructions, which when executed by a processor, cause the processor to:
invoke a first render call to render an input template;
receive a first message identifying a first placeholder variable within the input template in response to invoking the first render call;
generate a first rendered template by rendering the input template based on a unique value for the first placeholder value;
generate a second rendered template by rendering the input template based on a modified unique value for the first placeholder variable, wherein the modified unique value comprises a trigger string concatenated with the unique value, and wherein the generating the second rendered template comprises changing a context of the unique value in a syntactic structure of the first rendered template based on the trigger string, wherein the context corresponds to a location of the unique value within the syntactic structure of the first rendered template; and
store an identity of the first placeholder variable in a security vulnerability data structure in response to detecting a change in the context associated with the first placeholder variable between the first rendered template and the second rendered template.

10. The non-transitory computer readable medium of claim 9, wherein the stored instructions, when executed, further cause the processor to:
add a first field corresponding to the first placeholder variable to a discovered variable (DV) data structure in response to receiving the first message;
invoke a second render call to render the input template, wherein the second render call comprises the DV data structure;
receive a second message identifying a second placeholder variable within the input template in response to invoking the second render call; and
add a second field corresponding to the second placeholder variable to the DV data structure.

11. The non-transitory computer readable medium of claim 10, wherein the first render call comprises the DV data structure, wherein the DV data structure comprises a callback function, and wherein the first message is generated by the callback function when a template engine accesses the DV data structure while attempting to expand the first placeholder variable in the input template.

12. The non-transitory computer readable medium of claim 10, wherein the first message is an error message generated after attempting to expand the first placeholder variable in the input template.

13. The non-transitory computer readable medium of claim 9, wherein the context is one or more of a lexical context, a syntactic context, and a semantic context.

14. The non-transitory computer readable medium of claim 9, wherein the stored instructions, when executed, further cause the processor to execute a tainted-flow analysis with the first placeholder viable as a sink based on the security vulnerability data structure.

15. A system, comprising:
a memory storing instructions; and
a processor, coupled with the memory and to execute the instructions, the instructions when executed cause the processor to:
invoke a first render call to render an input template;
receive a first message identifying a first placeholder variable within the input template in response to invoking the first render call;
generate a first rendered template by rendering the input template based on a unique value for the first placeholder value;
generate a second rendered template by rendering the input template based on a modified unique value for the first placeholder variable, wherein the modified unique value comprises a trigger string concatenated with the unique value, and wherein the generating the second rendered template comprises changing a context of the unique value in a syntactic structure of the first rendered template based on the trigger string, wherein the context corresponds to a location of the unique value within the syntactic structure of the first rendered template;
store the first placeholder variable in a security vulnerability data structure in response to detecting a change in the context associated with the first placeholder variable between the first rendered template and the second rendered template.

16. The system of claim 15, wherein the instructions when executed further cause the processor to:
add a first field corresponding to the first placeholder variable to a discovered variable (DV) data structure in response to receiving the first message;
invoke a second render call to render the input template, wherein the second render call comprises the DV data structure;
receive a second message identifying a second placeholder variable within the input template in response to invoking the second render call; and
add a second field corresponding to the second placeholder variable to the DV data structure.

17. The system of claim 16, wherein the first render call comprises the DV data structure, wherein the DV data structure comprises a callback function, and wherein the first message is generated by the callback function when a template engine accesses the DV data structure while attempting to expand the first placeholder variable in the input template.

18. The system of claim 16, wherein the first message is an error message generated by the template engine after attempting to expand the first placeholder variable in the input template.

19. The system of claim 15, wherein the context is one or more of a lexical context, a syntactic context, and a semantic context.

20. The system of claim 19, wherein the syntactic context corresponds to the location of the unique value in a syntactic structure of the first rendered template.

\* \* \* \* \*